(12) United States Patent
Sutton et al.

(10) Patent No.: US 9,845,826 B2
(45) Date of Patent: Dec. 19, 2017

(54) HYBRID SPHERICAL AND THRUST BEARING

(71) Applicant: Bell Helicopter Textron Inc., Fort Worth, TX (US)

(72) Inventors: Drew Sutton, Watauga, TX (US); Frank B. Stamps, Colleyville, TX (US)

(73) Assignee: Bell Helicoter Textron Inc., Fort Worth, TX (US)

( * ) Notice: Subject to any disclaimer, the term of this patent is extended or adjusted under 35 U.S.C. 154(b) by 0 days.

(21) Appl. No.: 14/661,007

(22) Filed: Mar. 18, 2015

(65) Prior Publication Data

US 2015/0211573 A1   Jul. 30, 2015

Related U.S. Application Data

(63) Continuation of application No. 13/532,910, filed on Jun. 26, 2012, now Pat. No. 9,010,679.

(51) Int. Cl.
| | | |
|---|---|---|
| *F16C 27/06* | (2006.01) | |
| *B64C 27/54* | (2006.01) | |
| *B64C 27/605* | (2006.01) | |
| *F16F 1/393* | (2006.01) | |
| *F16C 11/08* | (2006.01) | |
| *F16C 11/06* | (2006.01) | |
| *F16C 17/10* | (2006.01) | |
| *F16C 33/20* | (2006.01) | |
| *F16C 33/74* | (2006.01) | |

(52) U.S. Cl.
CPC ............ *F16C 27/063* (2013.01); *B64C 27/54* (2013.01); *B64C 27/605* (2013.01); *F16C 11/0614* (2013.01); *F16C 11/083* (2013.01); *F16C 17/10* (2013.01); *F16C 33/201* (2013.01); *F16C 33/74* (2013.01); *F16F 1/393* (2013.01); *F16C 2326/43* (2013.01); *Y10T 29/4971* (2015.01)

(58) Field of Classification Search
CPC ...... F16C 27/063; F16C 17/10; F16C 33/201; F16C 33/74
See application file for complete search history.

(56) References Cited

U.S. PATENT DOCUMENTS

| | | | | |
|---|---|---|---|---|
| 2,732,267 | A * | 1/1956 | Stover | F16C 25/02 384/271 |
| 3,701,912 | A * | 10/1972 | Schulze | F04D 25/0606 310/90 |
| 4,243,274 | A * | 1/1981 | Greene | F16C 17/10 384/111 |
| 4,634,299 | A * | 1/1987 | Svensson | E02F 9/006 384/206 |
| 4,657,090 | A * | 4/1987 | Geczy | E21B 4/003 175/107 |
| 4,718,779 | A * | 1/1988 | Trudeau | F16C 33/74 384/152 |

(Continued)

*Primary Examiner* — Vishal Sahni

(57) ABSTRACT

According to one embodiment, a bearing features an elastomeric portion having an opening therethrough, a member disposed within the opening of the elastomeric portion, and a separation feature disposed between the member and the elastomeric portion. The member comprises a conical body portion arranged such that an interior diameter of the conical body portion is smaller than an exterior diameter of the conical body portion. The separation feature prevents contact between the member and the elastomeric portion.

28 Claims, 5 Drawing Sheets

(56) References Cited

U.S. PATENT DOCUMENTS

| | | | | |
|---|---|---|---|---|
| 4,919,547 A | * | 4/1990 | Schwartzman | F16C 17/10 384/100 |
| 5,110,221 A | * | 5/1992 | Narkon | F16C 33/201 384/203 |
| 2002/0114549 A1 | * | 8/2002 | Hokkirigawa | F16C 17/10 384/297 |

* cited by examiner

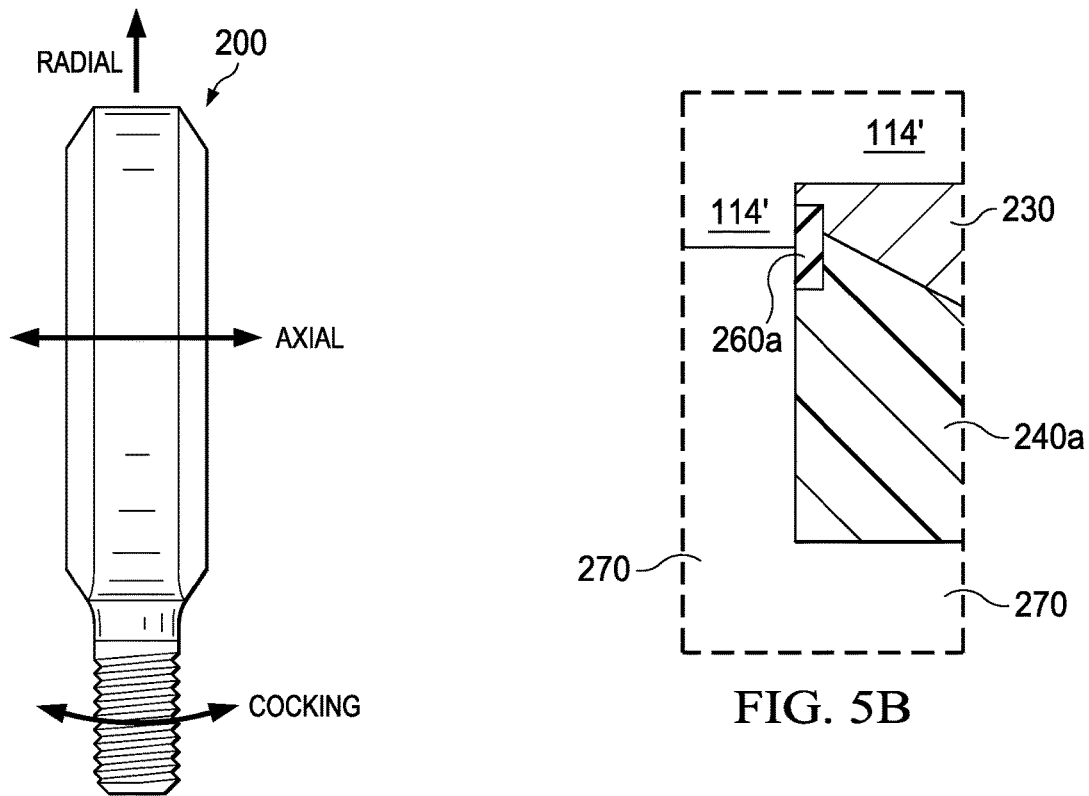
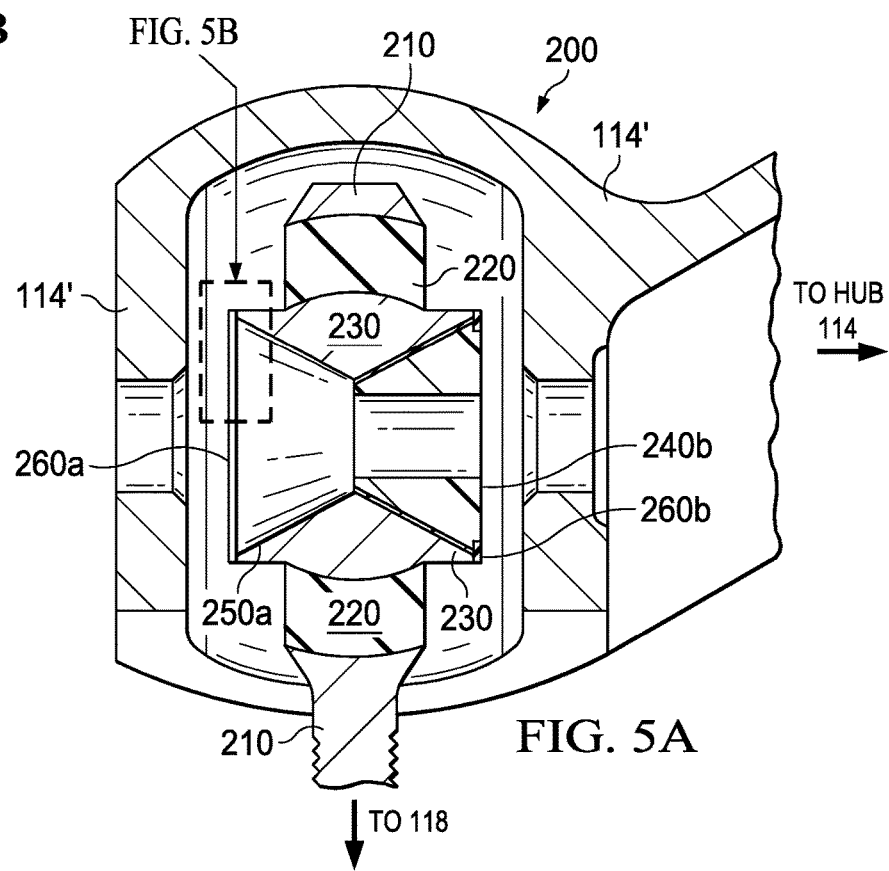
FIG. 4B
FIG. 5B
FIG. 5A

HYBRID SPHERICAL AND THRUST BEARING

RELATED APPLICATIONS

Pursuant to 35 U.S.C. §120, this application is a continuation of and claims priority to U.S. patent application Ser. No. 13/532,910, HYBRID SPHERICAL AND THRUST BEARING, filed Jun. 26, 2012. U.S. patent application Ser. No. 13/532,910 is hereby incorporated by reference.

TECHNICAL FIELD

This invention relates generally to bearings, and more particularly, to a hybrid spherical and thrust bearing.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

Particular embodiments of the present disclosure may provide one or more technical advantages. A technical advantage of one embodiment may include the capability to provide a bearing that protects against a variety of forces, such as torsional, radial, axial, and cocking forces. A technical advantage of one embodiment may include the capability to provide a bearing with a longer life expectancy. A technical advantage of one embodiment may also include the capability to reduce torsional buildup in an elastomeric bearing.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 4A and 4B show forces that may be exerted on the bearing of FIG. 3A; and FIGS. 5A and 5B show the bearing of FIG. 3A installed in the rotor system of FIG. 2.

DETAILED DESCRIPTION OF THE DRAWINGS

Figure 1:
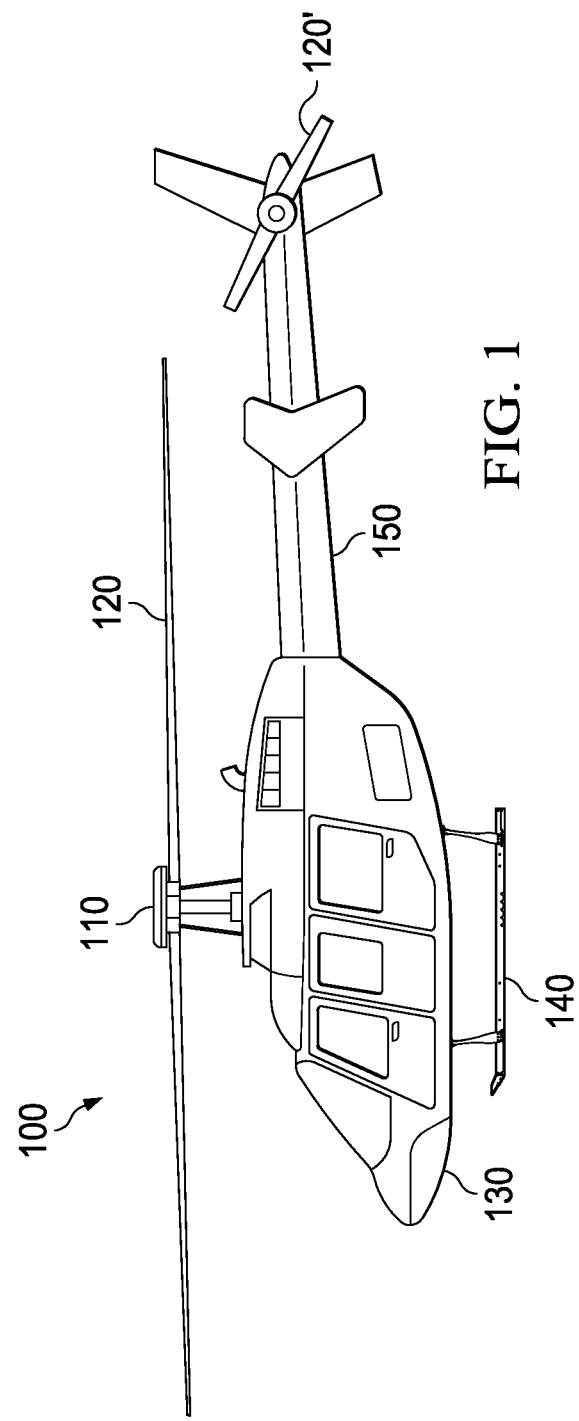
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
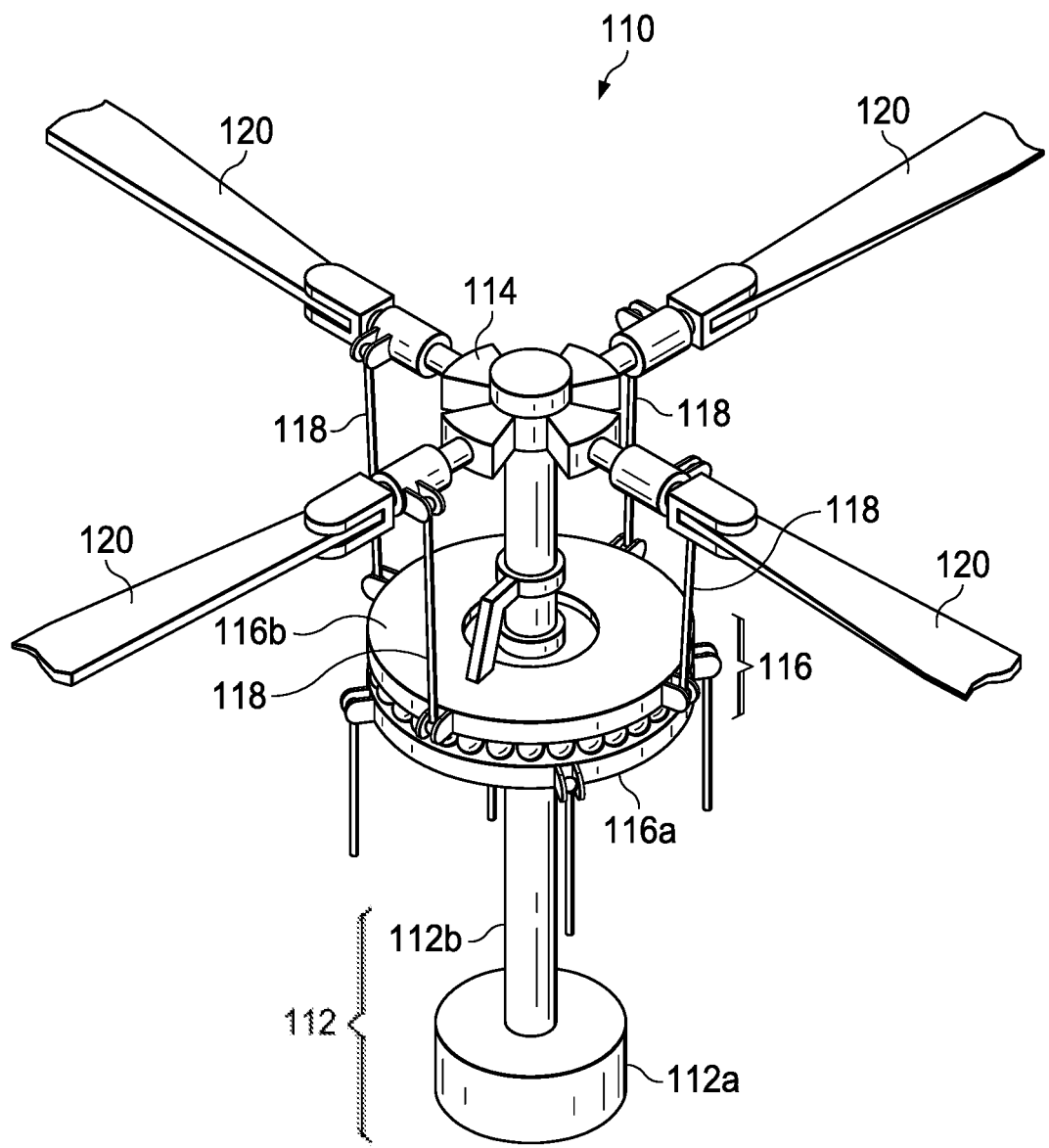
FIG. 2 shows the rotor system and blades of the rotorcraft of FIG. 1 according to one example embodiment.

FIG. 2 shows rotor system 110 and blades 120 of FIG. 1 according to one example embodiment. In the example of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

In the example of FIG. 2, pitch links 118 couple rotating swashplate ring 116b to blades 120. Pitch links 118 may be subject to various forces at its connection points with swashplate ring 116b and blades 120, such as torsional, radial, axial, and cocking forces. Teachings of certain embodiments recognize the capability to provide a bearing that protects against some or all of these forces. A particular embodiment is described below with regard to FIGS. 3A, 3B, 3C, 4A, 4B, 5A, and 5B.

Figure 3A:
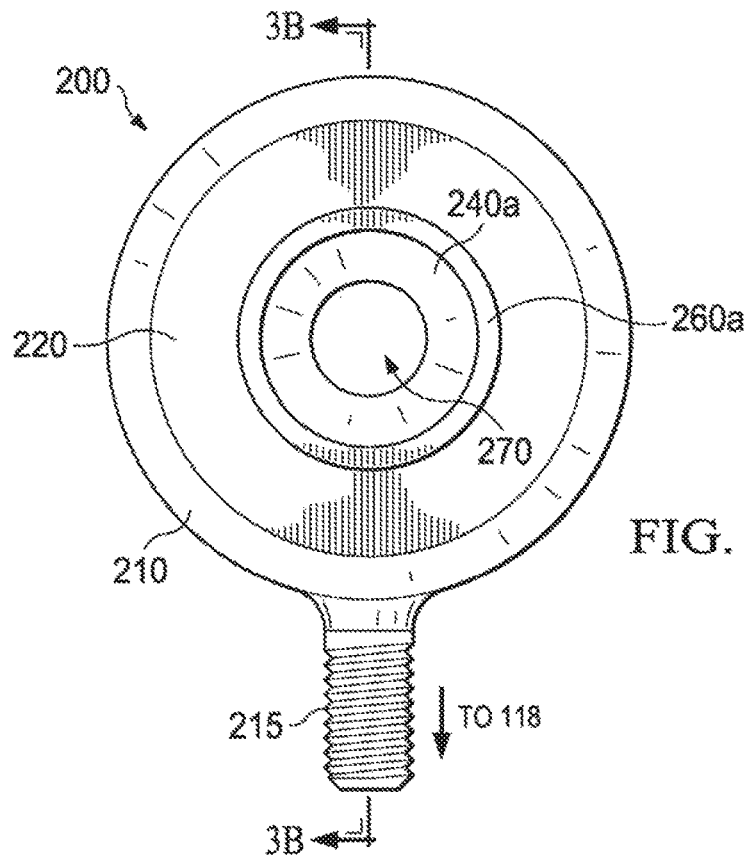
FIG. 3A shows a plan view of a bearing of the rotor system of FIG. 2 according to one example embodiment.
Figure 3B:
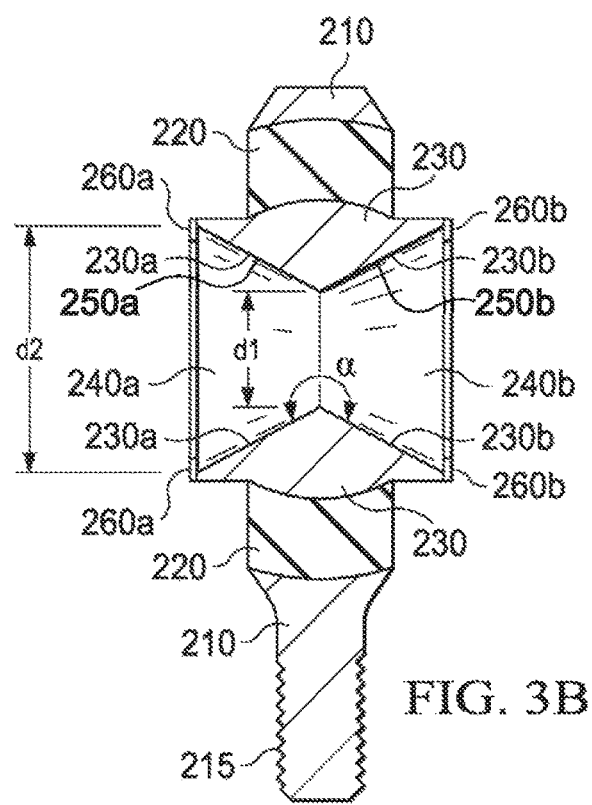
FIG. 3B shows a cross-section view of the bearing of FIG. 3A.
Figure 3C:
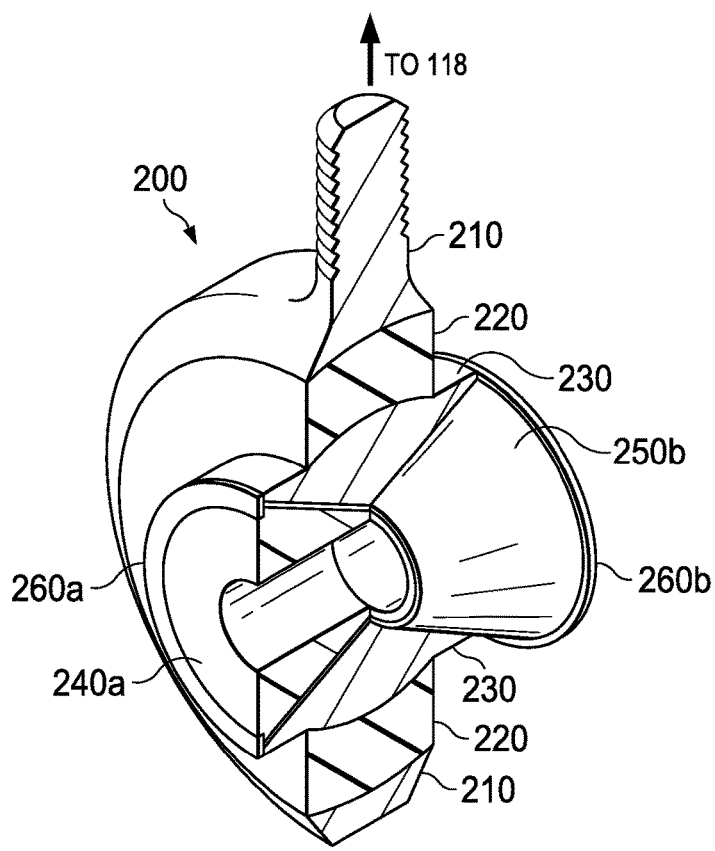
FIG. 3C shows a perspective view of the bearing of FIG. 3A.

FIGS. 3A-3C show a bearing 200 according to one example embodiment. FIG. 3A shows a plan view of bearing 200, FIG. 3B shows a cross-section view of bearing 200, and FIG. 3C shows a perspective view of bearing 200. Bearing 200 features an outer housing 210 having a threaded portion 215, an elastomeric bearing 220, an inner housing 230, conical members 240, bearing surfaces 250, and seals 260. Components of bearing 200 form an opening 270 through bearing 200. In FIG. 3C, portions of housing 210, elastomeric bearing 220, an inner housing 230, conical members 240, bearing surfaces 250, and seals 260 have been removed to provide additional clarity.

In the example of FIGS. 3A-3C, outer housing 210 is a metallic hollow cylinder having variable radii that forms a first opening therethrough. Other bearing components, such as elastomeric bearing 220, inner housing 230, conical members 240, bearing surfaces 250, and seals 260, may reside inside the first opening. Outer housing 210 also includes a threaded portion 215 for attaching bearing 200 to another device. For example, in one embodiment, threaded portion 215 may thread into an end of a pitch link, such as pitch link 118. In one example embodiment, a first bearing 200 threads into one end of pitch link 118, and a second bearing 200 threads into the opposite end of pitch link 118.

Elastomeric bearing 220 resides inside outer housing 210 and forms a second opening therethrough. Other bearing components, such as inner housing 230, conical members 240, bearing surfaces 250, and seals 260, may reside inside the second opening. Elastomeric bearing 220 is formed from an elastomeric material. In one example embodiment, elastomeric bearing 220 features a series of elastomeric and metal shims, which allow global dithering through local small elastomeric deflections. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression but may also be prone failure during tension and torsion.

In the example of FIGS. 3A-3C, inner housing 230 is a metallic hollow cylinder having variable radii that resides inside elastomeric bearing 220 and forms a third opening therethrough. Other bearing components, such as conical members 240, bearing surfaces 250, and seals 260, may reside inside the third opening. Inner housing 230 features two inner surfaces that define the third opening: an inner surface 230a and an inner surface 230b. Inner surface 230a is oriented at a reflex angle α relative to inner surface 230b such that the interior diameter of the third opening (d1) is smaller than the exterior diameter of the third opening (d2).

In the example of FIGS. 3A-3C, conical members 240 are metallic hollow cylinders having variable radii that reside inside inner housing 230 and forms opening 270. In one example embodiment, bearing 200 features two conical members 240: conical member 240a and conical member 240b. Conical member 240a resides inside the third opening adjacent inner surface 230a, and conical member 240b resides inside the third opening adjacent inner surface 230b. In the example of FIGS. 3A-3C, conical members 240a and 240b have outer conical surfaces oriented at angles corresponding to the positions of inner surfaces 230a and 230b, respectively. As such, the outer surface of conical member 240a matches the inner surface 230a of inner housing 230, and the outer surface of conical member 240b matches the inner surface 230b of inner housing 230.

In the example of FIGS. 3A-3C, inner housing 230 and conical members 240 are also symmetric. For example, the outer surfaces of conical members 240a and 240b incline at approximately the same angle. In addition, an imaginary plane that bisects inner housing 230 also bisects the reflex angle α relative to inner surface 230b. Conical members 240a and 240b may also contact or be equidistant from the imaginary plane. In some embodiments, inner surfaces 230a and 230b intersect to form a closed curve, and the closed curve lies on the imaginary plane.

Conical member 240a forms a fourth opening therethrough, and conical member 240b forms a fifth opening therethrough. The fourth and fifth openings, in combination, represent opening 270. In the example of FIGS. 3A-3C, first, second, and third openings have a variable diameter, whereas the fourth and fifth openings have a relatively constant diameter. The first, second, third, fourth, and fifth openings described are coaxial because a single axis may cross through each of these openings (e.g., through opening 270).

Bearing surfaces 250 separate inner housing 230 from conical members 240. In one example embodiment, bearing 200 features two bearing surfaces 250: bearing surface 250a and bearing surface 250b. Bearing surface 250a is in contact with inner bearing surface 230a and conical member 240a, and bearing surface 250b is in contact with inner bearing surface 230b and conical member 240b. Bearing surfaces 250 may be coupled to inner housing 230 and/or conical members 240.

Bearing surfaces 250 may be comprised of any suitable material. In one example embodiment, bearing surfaces 250 are comprised of a polytetrafluoroethylene (PTFE), a synthetic fluoropolymer of tetrafluoroethylene. The most well known brand name of PTFE is Teflon by DuPont Co. PTFE is a fluorocarbon solid, as it is a high-molecular-weight compound consisting wholly of carbon and fluorine. In another example embodiment, bearing surfaces 250 may be represented by a lubricant (e.g., grease) applied to conical members 240.

In the example of FIGS. 3A-3C, seals 260 are rings located adjacent inner housing member 230 and conical members 240. In one example embodiment, bearing 200 features two seals 260: seal 260a and 260b. Seal 260a is located adjacent inner housing member 230 and conical member 240a, and seal 260b is located adjacent inner housing member 230 and conical member 240b. Seals 260 may cover the joints between inner housing member 230 and conical members 240 where bearing surfaces 250 are located. Teachings of certain embodiments recognize that seals 260 may help prevent foreign objects from damaging bearing surfaces 250. In addition, teachings of certain embodiments recognize that seals 260 may help retain conical members 240 in place when bearing 200 is installed in a device and is subjected to various forces. Seals 260 are described in greater detail with regard to FIGS. 5A and 5B.

Bearing 200 may be assembled in any suitable manner. In one example embodiment, elastomeric material 220 is inserted into outer housing 210, and inner housing 230 is inserted into elastomeric material 220. In some embodiments, elastomeric material 220 and inner housing 230 may be inserted in a single step, such as by curing elastomeric material 220 between outer housing 210 and inner housing 230. Conical members 240a and 240b may be inserted into the third opening of inner housing member 230, and seals 260 may be inserted around conical members 240 to retain seals 260 in place. In one example embodiment, seals 260 are inserted in a lip of inner housing 230 and allowed to slip against conical members 240a and 240b.

Figure 4A:
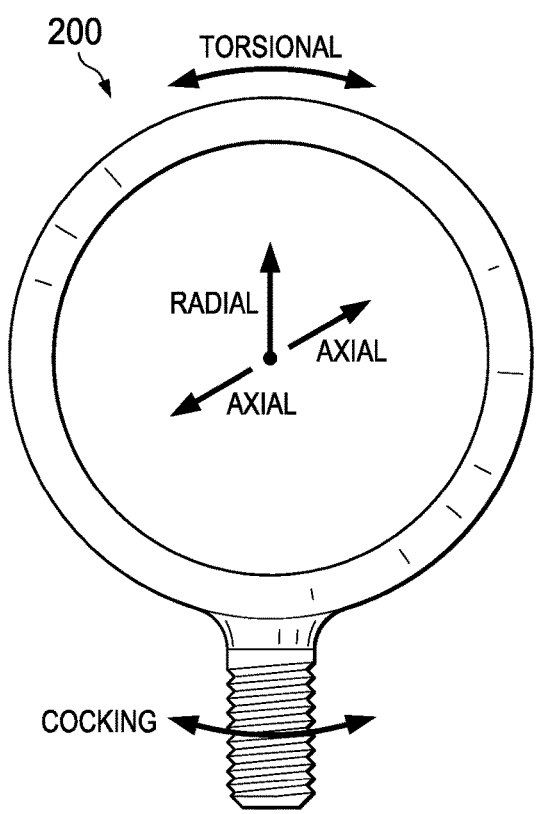

Bearing 200 may operate as a hybrid elastomeric bearing and thrust bearing. For example, elastomeric material 220 may represent the "elastomeric bearing" portion of the hybrid bearing, and conical elements 240 and bearing surfaces 250 may represent the "thrust bearing" portion of the hybrid bearing. Teachings of certain embodiments recognize that a hybrid elastomeric bearing and thrust bearing such as bearing 200 may protect against a variety of forces, such as torsional, radial, axial, and cocking forces. The torsional, radial, axial, and cocking forces are illustrated in FIGS. 4A and 4B.

In some embodiments, the elastomeric bearing portion of bearing 200 may carry the forces due to cocking motions. In addition, conical members 240a and 240b may allow the elastomeric bearing portion of bearing 200 to center itself while taking cocking loads. The thrust bearing portion of bearing 200, on the other hand, may carry axial loads in two directions. In addition, conical members 240 are free to rotate relative to inner housing member 230. Teachings of certain embodiments recognize that allowing conical members 240 to rotate relative to housing member 230 may relieve elastomeric material 220 of torsional loading and prevent the need of anti-rotation features on the mating assemblies.

As explained above, bearing 200 may be installed at either end of pitch link 118. Thus, bearing 200 may be coupled either between pitch link 118 and swashplate 116 or between pitch link 118 and hub 114.

FIG. 5A shows bearing 200 coupled between pitch link 118 and a pitch horn 114' associated with hub 114. As seen in FIG. 5A, bearing 200 fits within a recess in pitch horn 114'. Seals 260 abut walls of the recess, which may keep seals 260 in place. Seals 260 may retain conical members 240 in place. In some embodiments, bushings may be provided in the recess in pitch horn 114' to apply pre-tensional force against conical members 240 and prevent conical members 240 from rotating. Conical members 240 may also receive force from inner housing 230 and transmit and transmit some of this force against the walls of the recess in pitch horn 114'.

FIG. 5B shows a closer view of a cross-section of the interaction between conical members 240, seal 260a, and the pitch horn 114' of FIG. 5A. As seen in FIG. 5B, pitch horn 114' holds seal 260a in place against conical member 240a. In this example, conical member 240a does not directly contact pitch horn 114'. Rather, conical member 240a and pitch horn 114' are separated by opening 270, and conical member 240a is free to rotate relative to pitch horn 114'. In some embodiments, seal 230a may move relative to pitch horn 114', inner housing 230, and/or conical member 240a.

In one alternative embodiment, inner member 230 features a lip that holds seal 260 in place, which in turn retains conical members 240 in place. In this example embodiment, conical members 240 do not rotate with respect to pitch horn 114'. Inner member 230 is free to rotate torsionally (about the axis of opening 270) about bearing surfaces 250. This example embodiment may also feature bushings in the recess in pitch horn 114' to apply pre-tensional force against conical members 240.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A bearing, comprising:
an outer housing having an opening therethrough;
an elastomeric portion disposed within the opening of the outer housing and in contact with the outer housing, the elastomeric portion having an opening therethrough;
a separation feature disposed within the opening of the elastomeric portion and in contact with the elastomeric portion, the separation feature having an opening therethrough; and
a member disposed within the opening of the separation feature and in contact with the separation feature, the member comprising a conical body portion arranged such that an interior diameter of the conical body portion is smaller than an exterior diameter of the conical body portion,
wherein the separation feature is configured to prevent contact between the member and the elastomeric portion.

2. The bearing of claim 1, wherein the separation feature comprises a first bearing surface in contact with the member such that the member is free to rotate within the elastomeric portion.

3. The bearing of claim 2, wherein the first bearing surface is a fluorocarbon bearing.

4. The bearing of claim 2, wherein the first bearing surface is comprised of polytetrafluoroethylene.

5. The bearing of claim 1, wherein the opening of the outer housing is coaxial with the opening of the elastomeric portion.

6. The bearing of claim 1, wherein the separation feature comprises an inner housing.

7. The bearing of claim 6, wherein the opening of the inner housing is coaxial with the opening of the elastomeric portion.

8. The bearing of claim 6, further comprising a first bearing surface in contact with the inner housing and disposed relative to the member such that the member is free to rotate within the elastomeric portion.

9. The bearing of claim 8, further comprising a seal adjacent the inner housing and the member and covering the first bearing surface.

10. The bearing of claim 6, the inner housing comprising a first inner surface and a second inner surface defining the opening therethrough, the second inner surface oriented at a reflex angle relative to the first inner surface such that an interior diameter of the opening of the inner housing is smaller than an exterior diameter of the opening of the inner housing.

11. The bearing of claim 10, wherein a plane that bisects the inner housing also bisects the reflex angle.

12. The bearing of claim 10, wherein the first inner surface and the second inner surface intersect along a closed curve.

13. The bearing of claim 12, wherein the closed curve lies on a plane that bisects the outer housing.

14. The bearing of claim 10, wherein the member comprises an outer conical surface oriented at an angle corresponding to the orientation of the first inner surface.

15. The bearing of claim 14, wherein the member is disposed adjacent to the first inner surface inside the opening of the inner housing.

16. The bearing of claim 15, further comprising a second member disposed adjacent to the second inner surface inside the opening of the inner housing, the second member comprising a second conical body portion arranged such that an interior diameter of the second conical body portion is smaller than an exterior diameter of the second conical body portion.

17. The bearing of claim 16, further comprising:
   a first bearing surface in contact with the inner housing and with the member, the first bearing surface separating the member from the first inner surface; and
   a second bearing surface in contact with the inner housing and with the second member, the second bearing surface separating the second member from the second inner surface.

18. The bearing of claim 17, wherein the first bearing surface and the second bearing surface are disposed relative to the member and the second member such that the member and the second member are free to rotate within the inner housing.

19. The bearing of claim 1, wherein the conical body portion is a frustum.

20. A bearing, comprising:
   an elastomeric portion having an opening therethrough;
   a member disposed within the opening of the elastomeric portion, the member comprising a conical body portion arranged such that an interior diameter of the conical body portion is smaller than an exterior diameter of the conical body portion; and
   an inner housing disposed adjacent to the elastomeric portion inside the opening of the elastomeric portion and configured to prevent contact between the member and the elastomeric portion, the inner housing comprising:
      an opening therethrough which is configured to receive the member;
      a first inner surface at least partially defining the opening of the inner housing; and
      a second inner surface at least partially defining the opening of the inner housing, the second inner surface oriented at a reflex angle relative to the first inner surface such that an interior diameter of the opening of the inner housing is smaller than an exterior diameter of the opening of the inner housing,
      wherein the first inner surface and the second inner surface are both inner surfaces with respect to the inner housing.

21. The bearing of claim 20, wherein a plane that bisects the inner housing also bisects the reflex angle.

22. The bearing of claim 20, wherein the first inner surface and the second inner surface intersect along a closed curve.

23. The bearing of claim 22, wherein the closed curve lies on a plane that bisects the outer housing.

24. The bearing of claim 20, wherein the member comprises an outer conical surface oriented at an angle corresponding to the orientation of the first inner surface.

25. The bearing of claim 24, wherein the member is disposed adjacent to the first inner surface inside the opening of the inner housing.

26. The bearing of claim 25, further comprising a second member disposed adjacent to the second inner surface inside the opening of the inner housing, the second member comprising a second conical body portion arranged such that an interior diameter of the second conical body portion is smaller than an exterior diameter of the second conical body portion.

27. The bearing of claim 26, further comprising:
   a first bearing surface in contact with the inner housing and with the member, the first bearing surface separating the member from the first inner surface; and
   a second bearing surface in contact with the inner housing and with the second member, the second bearing surface separating the second member from the second inner surface.

28. The bearing of claim 27, wherein the first bearing surface and the second bearing surface are disposed relative to the member and the second member such that the member and the second member are free to rotate within the inner housing.

* * * * *